July 24, 1928.

J. E. POINTON

BAKING OVEN

Filed July 12, 1927

1,678,076

2 Sheets-Sheet 1

J. E. Pointon
INVENTOR

By: Marko & Clark
Attys.

July 24, 1928.  1,678,076
J. E. POINTON
BAKING OVEN
Filed July 12, 1927  2 Sheets-Sheet 2

J. E. Pointon
INVENTOR
By: Marks & Clark
Attys.

Patented July 24, 1928.

1,678,076

UNITED STATES PATENT OFFICE.

JOHN EDWARD POINTON, OF PETERBOROUGH, ENGLAND, ASSIGNOR TO BAKER PERKINS COMPANY INCORPORATED, OF NEW YORK, N. Y.

BAKING OVEN.

Application filed July 12, 1927, Serial No. 205,212, and in Great Britain September 1, 1926.

This invention relates to continuous ovens, of the type wherein the goods or articles are conveyed through the baking chamber on an endless conveyor, and has for its object to enhance the efficiency and convenience of such ovens particularly when employed in the production of confectionery and other goods requiring variable periods of baking.

The invention comprises the combination with a baking chamber having a circuitously arranged conveyor and heating elements therein, of means whereby from the one position on the exterior of the chamber goods may be placed upon the conveyor and withdrawn therefrom at various points or positions in its course through the chamber, and so that goods requiring subjection to the baking heat for varying periods and/or under varying conditions as to a steam or dry atmosphere and otherwise, may be in simultaneous transit through the oven thereby enabling bakings under such varying conditions to be effected concurrently.

Referring to the two accompanying sheets of explanatory drawings:—

Figure 1:
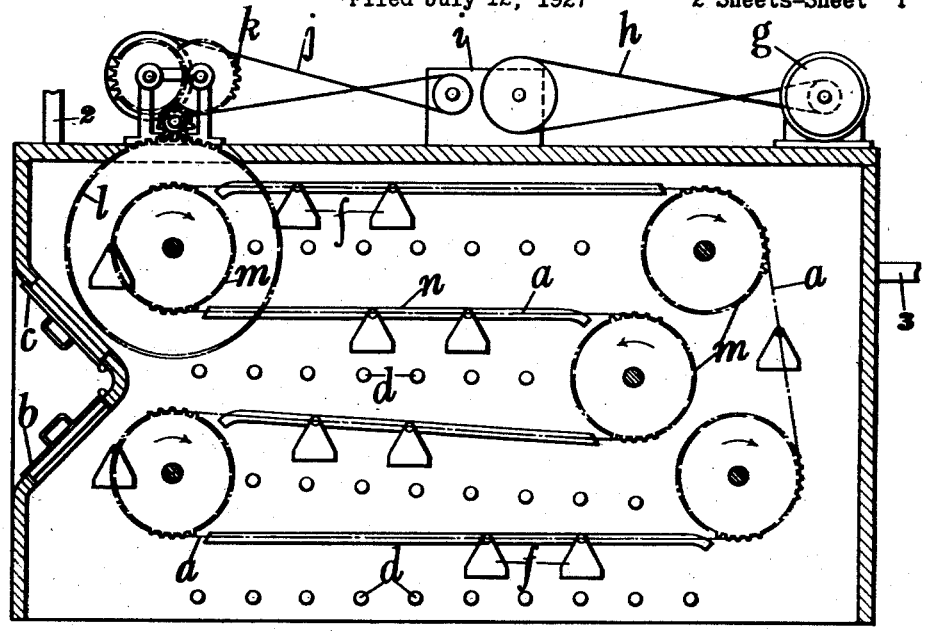
Figure 2:
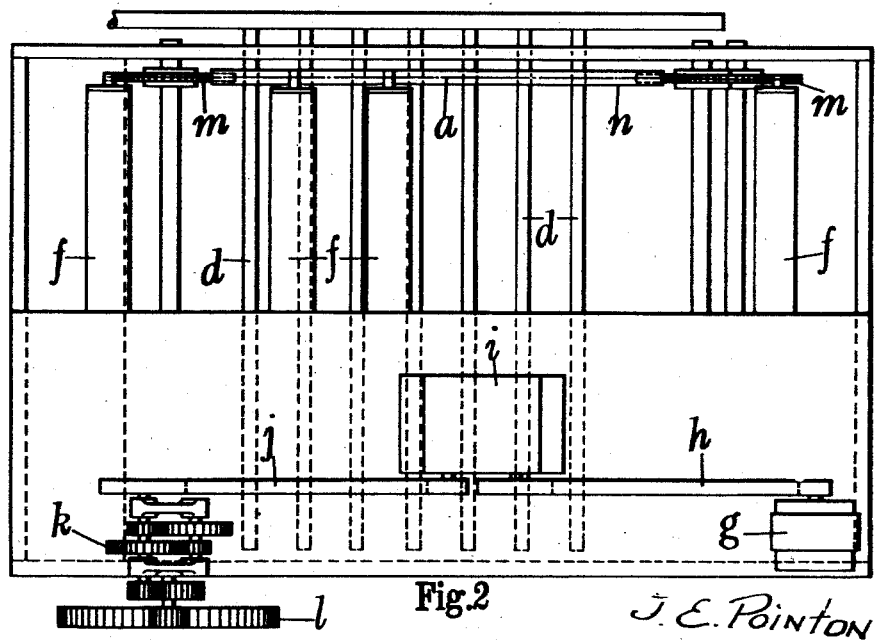
Figure 3:
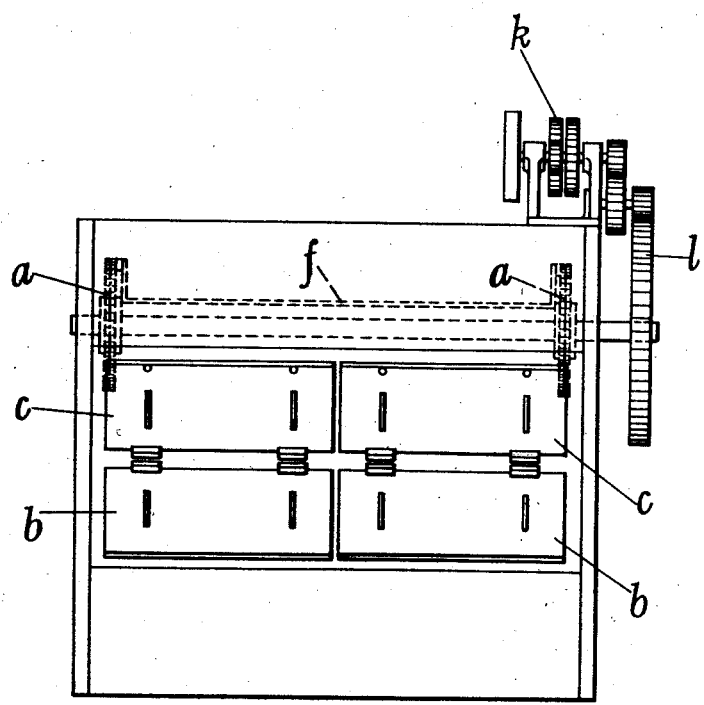

Figure 1 is a sectional elevation, Figure 2 a plan with half of the top removed, and Figure 3 an end view showing, in diagrammatic form, an oven in accordance with this invention.

The same reference letters in the different views indicate the same or similar parts.

In carrying the invention into effect, there is provided at the front or operative end or side of the oven a plurality of doors giving access to the baking chamber and such as to permit of the goods being readily and conveniently placed upon and withdrawn from the conveyor $a$ at different positions in its circuitous course through the chamber. Such doors as $b$, $c$, are preferably arranged in pairs and, as shown, at Figure 1, in a V or angular disposition and projecting towards the interior of the chamber, the arrangement enabling an operative without change of position to place the goods upon and withdraw them from the conveyor $a$ at different points in its course. The location of the said pairs of doors or duplex doors is such that though there is but a little actual distance between the said points, the transit of the conveyor $a$ from one to the other represents a considerable proportion of its circuit and may, for example, represent one-half or nearly one-half the circuitous course of the conveyor through the chamber, as will be seen at Figure 1.

With the oven equipped as aforesaid, the goods to be subjected to the maximum baking period afforded with a given speed of the conveyor, are placed upon and removed from the conveyor at one and the same door; they are thus carried through the complete path or circuit of the conveyor through the baking chamber. For a shorter baking period the goods are inserted on the conveyor through one door, as for example the door $c$, and withdrawn through the other door $b$. A still shorter baking period will be obtained if the goods are inserted on the conveyor through the door $b$ and withdrawn through the door $c$, because the path or course of the conveyor $a$ in travelling from the door $b$ to the door $c$ is shorter than its path or course from the door $c$ to the door $b$.

The upper or other lengths or runs of the conveyors may pass through a steam laden atmosphere whilst the remainder may pass through a dry atmosphere, such atmosphere being provided for within the baking chamber in any ordinary manner, as for example by means of a steam inlet pipe at 2 and an outlet pipe at 3. Thus whilst one batch of goods are being baked in a dry atmosphere another batch may be simultaneously baking in a steam atmosphere, or subjected, in the process of baking, to both a steam and a dry atmosphere. The said and other variable bakings can be all effected concurrently without any alteration or adjustment of the conveyor, either as regards its rate of movement or otherwise, or of any other part of the oven.

The heating elements $d$ may be of any suitable type, either gas, steam or electric, and provided with ordinary means for heat regulation. As illustrated at Figures 1 and 2, the heating elements $d$ are disposed between the respective straight lengths or runs of the conveyor $a$. The conveyor is of the known chain type with suspended shelves or trays as $f$, and electrically or otherwise operated through the usual speed changing mechanism employed for such services. In the example illustrated the electric motor $g$ transmits power through belt $h$ to gear box $i$ and thence through belt $j$ and gear wheels at $k$ to the conveyor driving wheel $l$. Suitable guide wheels as $m$ are arranged within the baking chamber and also supporting tracks as $n$ for the conveyor $a$. Any ordinary provision is made for keeping the conveyor at the required tension.

Having thus described my invention what I claim as new and desire to secure by Letters Patent is:—

1. In baking ovens, the combination comprising a baking chamber, a conveyor passing in a circuitous course through said chamber, heating elements disposed between the respective straight lengths or runs of the conveyor, an angular projection from the wall of the baking chamber into the interior of the latter, and a door in each of the sides of said projection said doors giving access to the conveyor at various positions in its circuitous course from the one position on the exterior of the chamber.

2. In baking ovens, the combination comprising a baking chamber, a conveyor passing in a circuitous course through said chamber, heating elements disposed between the respective straight lengths or runs of the conveyor, an angular projection from the wall of the baking chamber into the interior of the latter, a door in each of the sides of said projection, said doors giving access to the conveyor at various positions in its circuitous course from the one position on the exterior of the chamber, and means providing steam laden and dry atmospheres for said course.

In testimony whereof I have signed my name to this specification.

JOHN EDWARD POINTON.